(12) United States Patent
Sano et al.

(10) Patent No.: US 8,171,894 B2
(45) Date of Patent: May 8, 2012

(54) ENGINE SYSTEM

(75) Inventors: Tadashi Sano, Ushiku (JP); Shigenori Togashi, Abiko (JP); Takao Ishikawa, Hitachi (JP); Atsushi Shimada, Hitachinaka (JP); Kenichi Souma, Mito (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 12/323,550

(22) Filed: Nov. 26, 2008

(65) Prior Publication Data
US 2009/0139470 A1      Jun. 4, 2009

(30) Foreign Application Priority Data
Nov. 30, 2007   (JP) .................. 2007-309664

(51) Int. Cl.
*F02B 43/08* (2006.01)
(52) U.S. Cl. ............ 123/3; 429/414; 429/425; 261/131; 261/99; 123/1 A; 123/575; 123/527
(58) Field of Classification Search ........... 123/3, 41.51; 429/19, 425, 414; 60/320, 299; 180/301
See application file for complete search history.

(56) References Cited

U.S. PATENT DOCUMENTS

| | | | | | |
|---|---|---|---|---|---|
| 3,800,768 | A | * | 4/1974 | Rhodes et al. | 123/522 |
| 3,855,372 | A | * | 12/1974 | Koch | 261/131 |
| 4,018,190 | A | * | 4/1977 | Henault | 123/3 |
| 4,170,200 | A | * | 10/1979 | Takeuchi et al. | 123/3 |
| 4,862,836 | A | * | 9/1989 | Chen et al. | 123/3 |
| 6,257,175 | B1 | * | 7/2001 | Mosher et al. | 123/3 |
| 6,314,919 | B1 | * | 11/2001 | Pugachev | 123/3 |
| 6,571,748 | B2 | * | 6/2003 | Holder et al. | 123/3 |
| 7,235,322 | B2 | * | 6/2007 | Akikusa et al. | 429/425 |
| 7,568,452 | B2 | * | 8/2009 | Shimada et al. | 123/3 |
| 7,703,445 | B2 | * | 4/2010 | Haga | 123/525 |
| 2002/0104697 | A1 | * | 8/2002 | Hatanaka | 180/65.4 |
| 2006/0051261 | A1 | * | 3/2006 | Rong et al. | 422/198 |
| 2006/0204799 | A1 | | 9/2006 | Ishikawa et al. | |

(Continued)

FOREIGN PATENT DOCUMENTS

EP      1 691 065      8/2006
(Continued)

OTHER PUBLICATIONS

JP 2005-299499 Machine Translation, see attached document "JP2005299499MTT.pdf".*

(Continued)

*Primary Examiner* — Noah Kamen
*Assistant Examiner* — Long T Tran
(74) *Attorney, Agent, or Firm* — Antonelli, Terry, Stout & Kraus, LLP.

(57) ABSTRACT

An engine system in which hydrogen is employed as a fuel, including a reactor configured to cause a reaction using a catalyst, in which the reactor is constituted by alternately disposing plural exhaust passages and plural fuel passageways of the engine system with a wall interposed therebetween; at least one carrier configured to carry the catalyst and to be formed in a substantially rectangular plate shape is fitted in at least one of fuel passageways; and the carrier is provided with a plate portion which has a surface disposed in a fuel flowing direction and is formed in a substantially rectangular plate shape and at least one slit portion which divides the surface of the plate portion in the fuel flowing direction.

17 Claims, 5 Drawing Sheets

U.S. PATENT DOCUMENTS

| | | | |
|---|---|---|---|
| 2007/0028905 A1* | 2/2007 | Shinagawa et al. | 123/575 |
| 2007/0151527 A1* | 7/2007 | Shinagawa et al. | 123/3 |
| 2007/0209609 A1* | 9/2007 | Shimada et al. | 123/3 |
| 2008/0141984 A1* | 6/2008 | Haga | 123/525 |
| 2008/0241615 A1* | 10/2008 | Sugimasa et al. | 429/20 |
| 2008/0245318 A1* | 10/2008 | Kuroki et al. | 123/3 |
| 2009/0090312 A1* | 4/2009 | Stehl et al. | 123/3 |
| 2009/0194042 A1* | 8/2009 | Workman et al. | 123/3 |
| 2010/0180839 A1* | 7/2010 | Otterstrom et al. | 123/3 |
| 2010/0275858 A1* | 11/2010 | Jeffs et al. | 123/3 |
| 2011/0005473 A1* | 1/2011 | Ishikawa et al. | 123/3 |

FOREIGN PATENT DOCUMENTS

| | | |
|---|---|---|
| JP | 58-138252 | 8/1983 |
| JP | 59 120773 | 7/1984 |
| JP | 60-062646 | 4/1985 |
| JP | 2002-060279 A | 2/2002 |
| JP | 2005-291657 A | 10/2005 |
| JP | 2005-299499 | 10/2005 |
| JP | 2006-248814 | 9/2006 |
| JP | 2008-088922 | 4/2008 |

OTHER PUBLICATIONS

EP Search Report of Appln. No. 08020607 dated Mar. 22, 2011 in English.

Japanese Office Action mailed Jul. 26, 2011, for Japanese Application No. 2007-309664; 2 pages; Japanese Patent Office, Japan.

* cited by examiner

ENGINE SYSTEM

FIELD OF THE INVENTION

The present invention relates to an engine system. More specifically, the present invention relates to an engine system which employs as a fuel, either hydrogen produced from a hydrogen containing medium in terms of reaction using a catalyst or mixture of the hydrogen and the hydrogen containing medium.

DESCRIPTION OF RELATED ART

Since the engine system which employs gasoline as a fuel discharges carbon dioxide, hydrogen has been gaining attention as an alternative fuel for the countermeasure to global warming. However, usage of hydrogen is difficult in that hydrogen is combustible material and is highly explosive. Particularly, a high technique must be required for storing hydrogen in a gas state or a liquid state, and it is also a difficult technique to store hydrogen so from the viewpoint of safety and a large weight of a storage container.

Therefore, a technique has been developed in which hydrogen is stored while being contained in a hydrogen medium, hydrogen gas is extracted in terms of a chemical reaction at a necessary time, and then the hydrogen gas is supplied to the engine system. However, it is necessary to provide a constant heat source all the time when proceeding chemical reaction due to the fact that the chemical reaction takes place as an endothermic reaction. For example, in an automobile mounting thereon the engine system employing the gasoline as a fuel, when the afore-mentioned engine supplied with the hydrogen gas in terms of the chemical reaction, is mounted to replace the gasoline engine, a certain technique has been proposed in which the exhaust gas from the engine is used as the heat source (see JP-A-2005-299499).

Such a reactor incorporated in this type of engine system is operated under a high-temperature circumstance due to the exhaust gas from the engine. In some cases, a problem may arise in that the reactor itself is subjected to a thermal deformation due to different heat expansions of the respective parts of the reactor caused by either a combination of materials having different linear expansion coefficients or a difference in local temperature of the reactor. In case of severe deformation, since respective sectional areas of a plurality of fuel flow passageways or exhaust gas flow passage become non-uniform, heat amount supplied from the exhaust gas becomes non-uniform, thereby causing such a problem that reaction efficiency of the reactor is deteriorated as a whole.

Although there is disclosed a technique of a heat exchanger provided with a heat transfer mechanism which is the same as that of the reactor in various industrial fields, the technique is not based on the particular circumstance as mounted on the above-described automobile. For this reason, in spite of the fact that the engine system needs to be compact in size, it is difficult to avoid an increase in size or a complication of the engine system.

SUMMARY OF THE INVENTION

An object of the invention is to provide an engine system which is able to reduce an influence due to heat deformation of a reactor and in which either hydrogen produced from a hydrogen containing medium in terms of reaction using a catalyst or a mixture of the hydrogen and the hydrogen containing medium is employed as a fuel.

In order to achieve the above-described object, according to an aspect of the invention, there is provided an engine system in which either hydrogen produced from a hydrogen containing medium in terms of reaction using a catalyst or a mixture of the hydrogen and the hydrogen containing medium is employed as fuel, the engine system including a reactor configured to cause a reaction using the catalyst, wherein the reactor is configured by alternately disposing a plurality exhaust passageways and a plurality of fuel passageways of the engine system with a wall interposed therebetween, wherein at least one carrier configured to carry the catalyst and to be formed in a substantially rectangular plate shape is interposed in the inside of at least one of fuel passageways, and wherein the carrier is provided with a plate portion which has a surface disposed in a fuel flowing direction and is formed in a substantially rectangular plate shape, and at least one slit portion which divides the surface of the plate portion in a fuel flowing direction.

According to the above-described configuration of the invention, in the engine system in which either hydrogen produced from a hydrogen containing medium in terms of reaction using a catalyst or a mixture of the hydrogen and the hydrogen containing medium is employed as a fuel, since the slit is formed in the carrier of the reactor so as to reduce a variation in heat transmission circumstance in the inside of the reactor, it is possible to reduce an influence of heat deformation on the reactor.

According to the engine system, since it is possible to reduce the influence of the heat deformation of the reactor, it is possible to restrict deterioration of reaction efficiency of the reactor as a whole.

Other objects, features and advantages of the invention will become apparent from the following description of the embodiments of the invention taken in conjunction with the accompanying drawings.

BRIEF DESCRIPTION OF SEVERAL VIEWS OF DRAWINGS

DETAILED DESCRIPTION OF THE INVENTION

Embodiment 1

Figure 1:
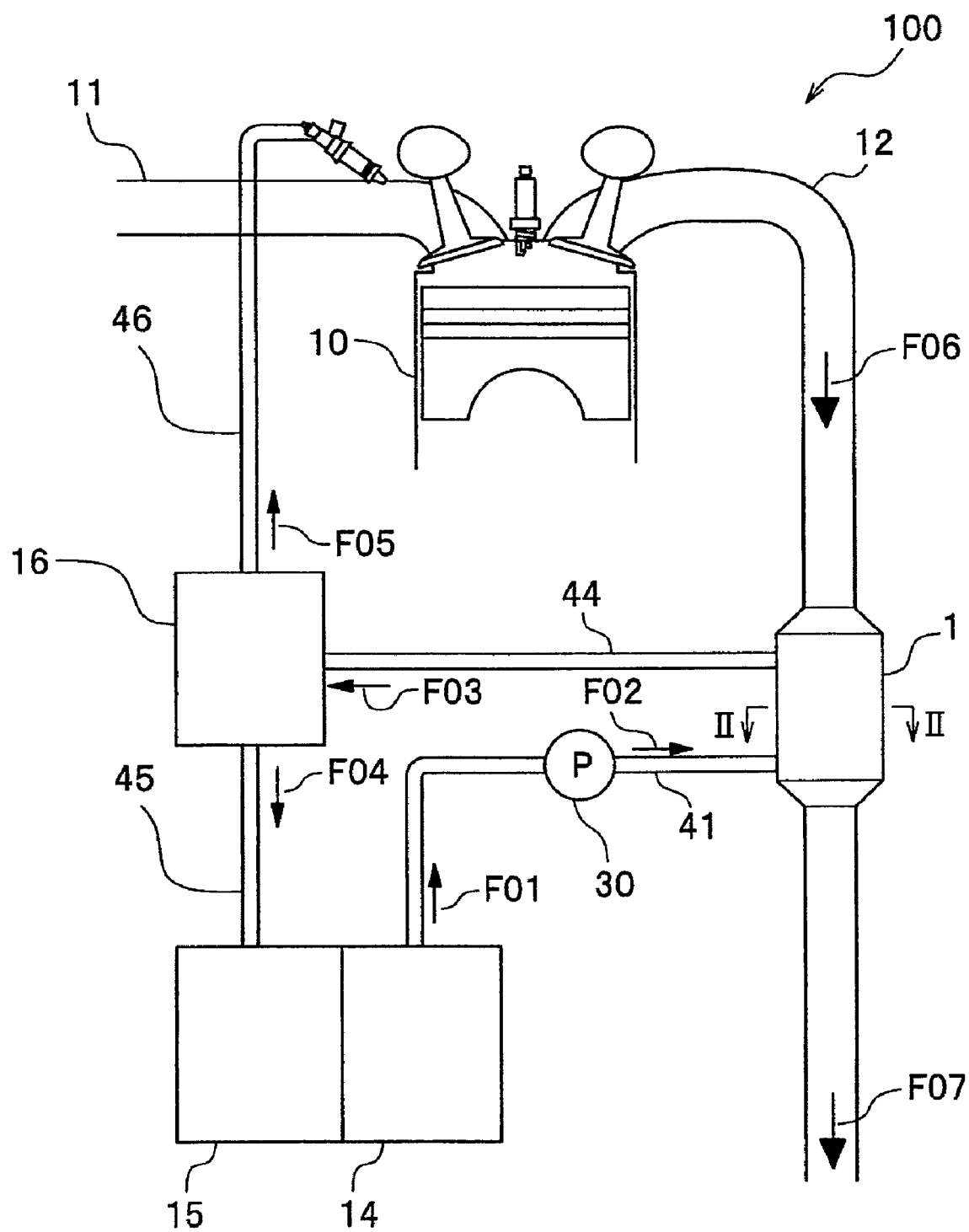
FIG. 1 is an explanatory and schematic view showing an entire configuration of an engine system according to a first embodiment of the invention.

Hereinafter, a first embodiment of the invention will be described in detail with reference to the accompanying drawings. FIG. 1 is an explanatory and schematic view showing an entire configuration of an engine system according to the present embodiment.

An engine system 100 according to the present embodiment includes an engine 10 employing a hydrogen medium as a fuel. The engine 10 is connected to an intake pipe 11 and an exhaust pipe 12, and a reactor 1 is disposed in a portion of the exhaust pipe 12.

Here, the hydrogen medium indicates all mediums capable of chemically storing and discharging hydrogen, which includes hydrocarbon-based fuel such as gasoline, light oil, kerosene, heavy oil, decaline, cyclohexane, methyl-cyclohexane, naphthalene, benzene, and toluene, mixed fuel thereof, hydrogen peroxide, ammonia, nitrogen, or oxygen. In the below description, the medium chemically storing hydrogen is referred to as "hydrogen medium" and the medium chemically discharging hydrogen is referred to as "dehydrogenation medium".

The hydrogen medium as a fuel is introduced from a hydrogen medium tank 14 to a pump 30 (see the arrow F01). Then, the hydrogen medium is pressurized by the pump 30, and is injected into a reactor 1 via a pipe 41 (see the arrow F02). Since the hydrogen medium contacts with a catalyst at a high temperature in the reactor 1, chemical reaction therebetween is promoted. Subsequently, the hydrogen medium is decomposed to produce reaction gas including dehydrogenation medium and hydrogen gas.

The produced gas passes through a pipe 44 (see the arrow F03) and is supplied to a separator 16. In the separator 16 provided with a cooler, the produced gas is separated into hydrogen and other dehydrogenation mediums. The separated dehydrogenation mediums pass through a pipe 45 (see the arrow F04) and are stored in a dehydrogenation medium tank 15. On the other hand, the separated hydrogen passes through a pipe 46 (see the arrow F05) and is supplied to the inside (not shown) of the engine 10 via the intake pipe 11. The hydrogen combusted in the engine 10 becomes high-temperature exhaust gas. The high-temperature exhaust gas passes through the exhaust pipe 12 (see the arrow F06), is supplied as a heat source to the reactor 1, and then is discharged to the atmosphere via the reactor 1 (see the arrow F07).

Figure 2:
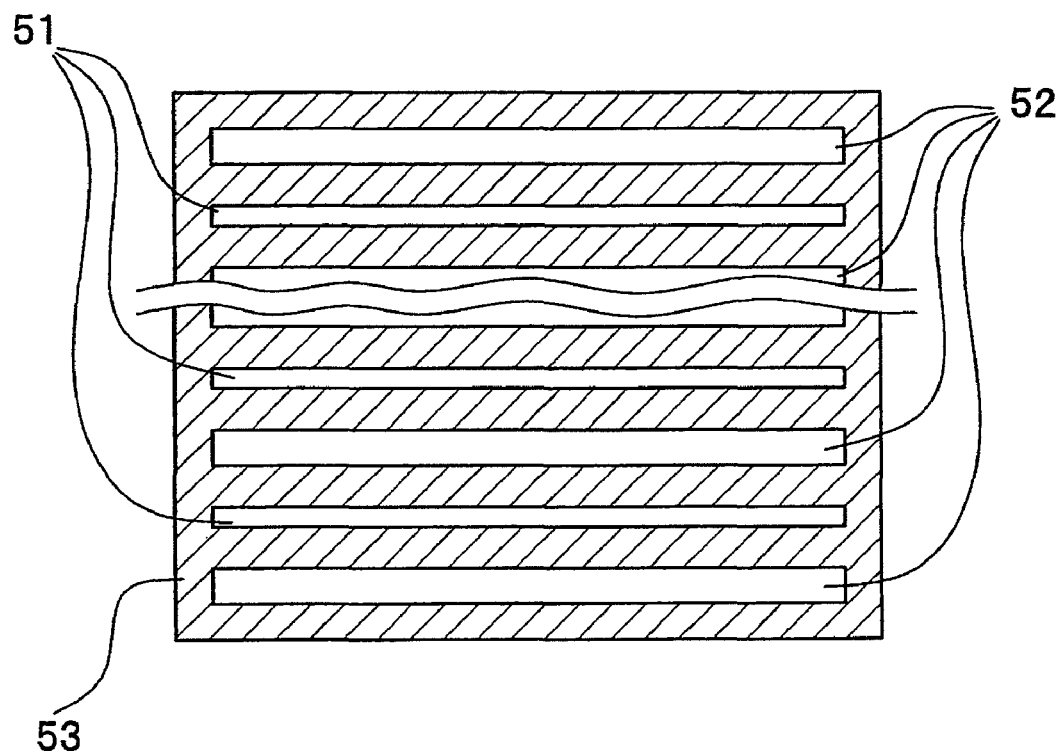
FIG. 2 is a cross-sectional view showing a reactor according to the first embodiment of the invention, taken along the line II-II shown in FIG. 1.

FIG. 2 is a cross sectional view showing the reactor 1 when taken along the line II-II shown in FIG. 1. A structure of the reactor is formed by a housing 53 provided with an exhaust passageway 52 and a fuel passageway 51 therein which are juxtaposed to each other. Specifically, the reactor 1 has a structure in which the exhaust passage 52 and the fuel passageway 51 having rectangular flow-passage sections are alternately superposed on a wall of the housing 53 interposed therebetween. According to the reactor 1 with such a configuration, exhaust heat of the engine 10 is transmitted from the exhaust passage 52 to the adjacent fuel passageway 51 with the wall interposed therebetween, and dehydrogenation reaction of the hydrogen medium is promoted in terms of the heat transmission, thereby realizing high-efficient heat exchange and a compact in size of the reactor 1.

Additionally, a reaction speed of the dehydrogenation reaction increases as the temperature increases. Therefore, in the present embodiment, since the outermost flow passageway (the uppermost portion and the downmost portion shown in FIG. 2) is used as the exhaust passage 52, it is possible to prevent the temperature of the fuel passageway 51 from decreasing. With such a configuration, since it is possible to maintain the fuel passageway 51 at a high temperature, it is possible to more realize a compact in size of the reactor.

Figure 3:
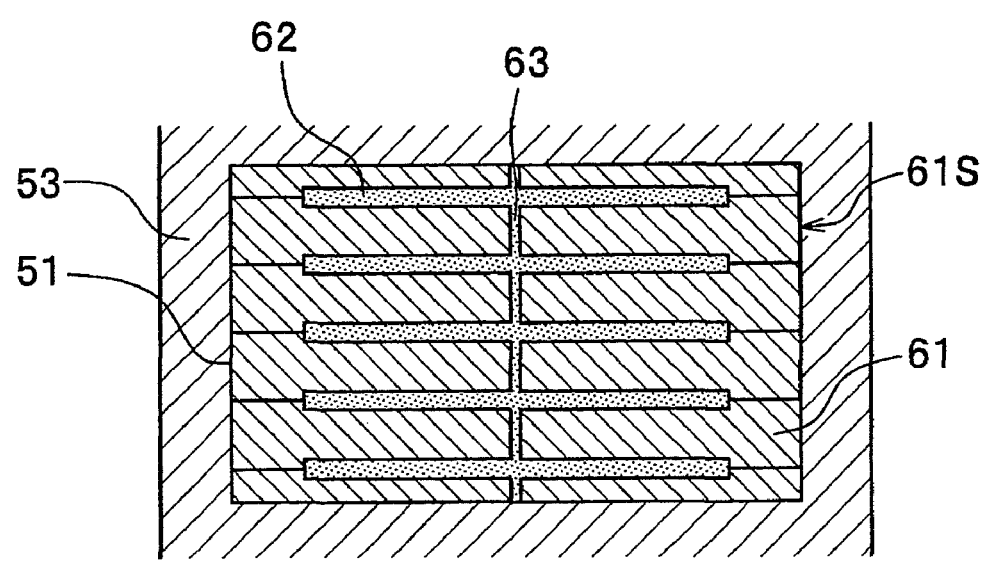
FIG. 3 is an explanatory cross-sectional view showing one section perpendicular to a fuel flowing direction (a direction from the backward side toward the forward side of FIG. 2) of one fuel passageway according to the first embodiment of the invention, enlarged only in the vertical direction.
Figure 4:
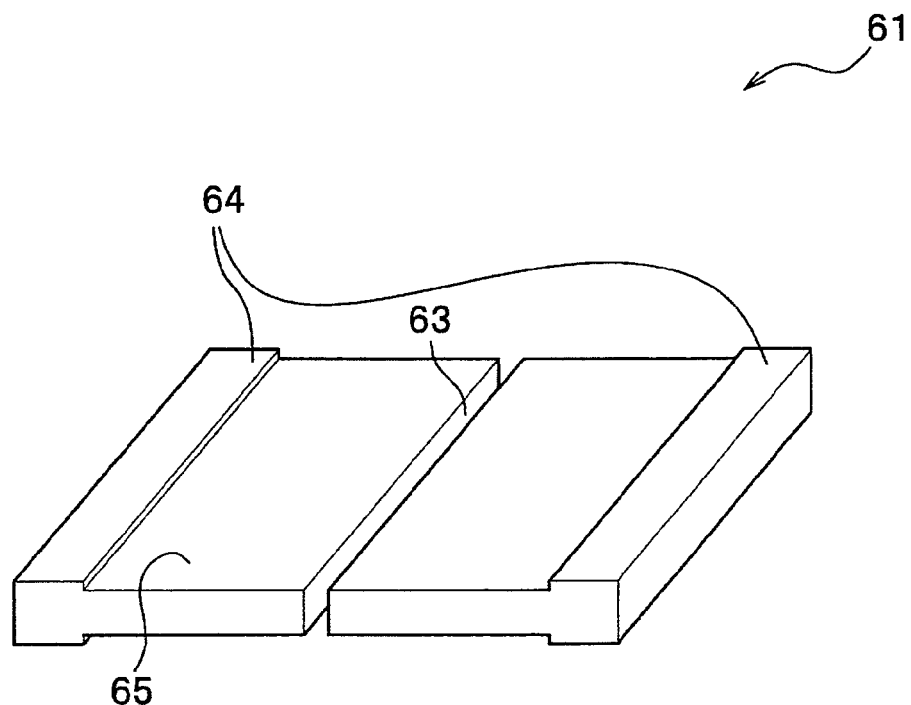
FIG. 4 is a perspective view showing an example of a plate disposed in a fuel passageway according to the first embodiment of the invention.

FIG. 3 is an explanatory cross sectional view showing a section perpendicular to a fuel flowing direction (a direction from the backward side to the forward side of FIGS. 2 and 3) of one fuel passageway 51, which is enlarged only in a vertical direction. FIG. 4 is a perspective view showing an example of an after-mentioned plate disposed in the fuel passageway 51. Additionally, in FIG. 4, in the same manner as FIG. 3, the plate is enlarged in a vertical direction.

As shown in FIG. 3, multiple sheets of very thin plates 61 are fitted and inserted into one fuel passageway 51 shown in FIG. 2 while being laminated in a passage space. Then, as shown in FIG. 4, each plate 61 is substantially formed into a rectangular plate shape, and forms a carrier in which a first plate 64 and a second plate 65 carry a catalyst. A thickness of the first plate 64 is larger than that of the second plate 65, and the second plate 65 is formed into a recessed plane. Then, as shown in FIG. 3, the adjacent plates 61 and 61 superposed to form a lamination in a vertical direction of the drawing form a plate fuel passageway 62 in such a manner that the surfaces of the first plates 64 and 64 are combined with each other in a lamination direction. The plate 61 is provided with a slit 63 for dividing the surface of the plate 61 in a fuel flowing direction. In terms of the slit 63, the plate fuel passageways 62 of the laminated plates 61 communicate with one another.

With such a configuration, even when a part of the plate is deformed by the heat influence and a part of the flow-passage section of the plate fuel passageway 62 becomes non-uniform, the plate fuel passageway 62 is capable of flowing the fuel on the upstream side and the downstream side of the non-uniform part in terms of the slit 63. In terms of the flow of the fuel, it is possible to more appropriately distribute the hydrogen medium (redistribution) and thus to make the reaction uniform.

For example, even when a part of the plate fuel passageway 62 is closed by heat deformation, since the slit 63 is provided, a flow passageway capable of avoiding the closed part exists at other parts. Accordingly, since the fuel flows into the flow passageway, it is possible to reduce a non-uniform state of the transmitted heat amount, and thus to restrict deterioration of the reaction efficiency of the reactor 1 as a whole.

Additionally, since the multiple sheets of plates 61 are fitted into the fuel passageway 51 while being superposed or laminated (see FIG. 3) in such a manner that the slits 63 are laminated so that the positions thereof are coincident with each other, even when the flow-passageway section becomes non-uniform or the flow passageway is closed by the heat deformation, it is possible to facilitate the uniform redistribution of the fuel.

Here, since a heat-resisting property needs to be ensured in the housing 53 and a catalyst carrying function needs to be ensured in the plate 61, in some cases, the housing 53 and the plate 61 may be formed of different metal materials. In accordance with a combination of different metal materials, the plate 61 may be largely thermal-expanded in a transverse direction (in a horizontal direction of FIG. 3) of a surface perpendicular to a fuel flowing direction. In the conventional art, since a plate side surface 61S is restrained in the housing 53, it is difficult to avoid deformation of the plate 61. However, in the present embodiment, since the slit 63 is provided, the thermal-expanded amount is absorbed, thereby preventing large deformation such as buckling caused by heat expansion.

Since the dehydrogenation reaction is endothermic reaction, sufficient heat needs to be supplied, and hence a heat supply passageway to the reactor 1 is important. A main heat transmission route to the fuel passageway 51 is configured such that the exhaust heat of the engine is transmitted to the housing 53, is conducted to the plate 61, and then is transmitted to the plate fuel passageway 62 (fuel passageway 51). In the present embodiment, since a minimum width of the slit 63 is smaller than that of the plate fuel passageway 62, most of hydrogen medium flows through the plate fuel passageway 62.

Additionally, in the present embodiment, since the slit 63 is formed in the vicinity of the center in a transverse direction of the plate 61, heat is high-efficiently supplied from the housing 53 located in the outside in a transverse direction of FIG. 3 to the plate side surface 61S, and is supplied from the plate side surface 61S to the center in a transverse direction of the plate 61. Additionally, since the minimum width of the slit 63 is smaller than the thickness of the plate 61, it is possible to increase the surface area of the plate 61.

With such a configuration, since it is possible to increase the area carrying the catalyst necessary for the dehydrogenation reaction, it is possible to realize a compact in size of the reactor 1.

Embodiment 2

Next, the engine system according to a second embodiment of the invention will be described. In the engine system according to the present embodiment, the same reference numerals designate the same or like components as those of the first embodiment (see FIG. 1 or the like), and the repetitive description thereof will be therefore omitted. The different parts from the first embodiment will be mainly described.

Figure 5:
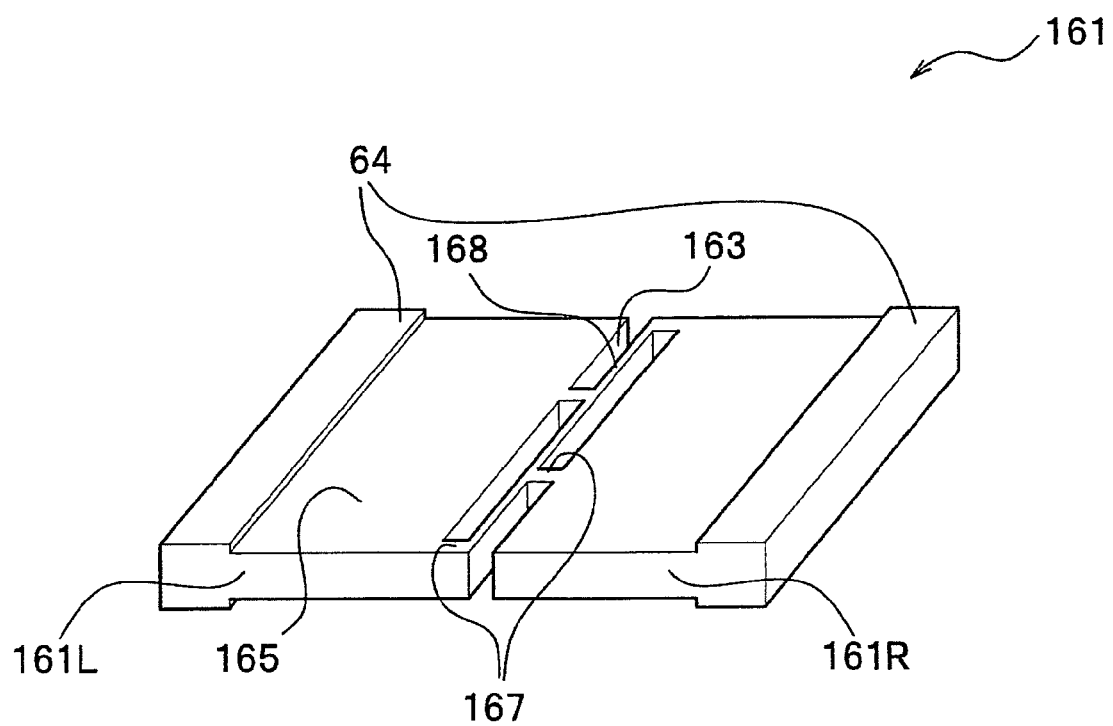
FIG. 5 is a perspective view showing a plate disposed in an inside of a fuel passageway of a reactor according to a second embodiment of the invention.

FIG. 5 is a perspective view showing a plate 161 disposed in the inside (see FIGS. 1 and 2) of the fuel passageway 51 of the reactor 1 according to the present embodiment. For example, a size of the plate 161 is not more than that of 200 mm×500 mm×0.5 mm. A size of the fuel passageway 62 (see FIG. 3) formed between the laminated plates 161 and 161 is not more than that of 1 mm. Additionally, these dimensions are examples, but the present embodiment is not limited to these dimensions.

The present embodiment is different from the first embodiment in that the shape of the plate 161 shown in FIG. 5 is different. That is, in the present embodiment, a right plate 161R and a left plate 161L shown in FIG. 5 are bridge-connected to each other via a first connection portion 167 and a second connection portion 168. In other words, the second plates 165 divided by the slit 163 are bridge-connected to each other via the first connection portion 167 and a second connection portion 168. With such a configuration, even when the left and right plates 161L and 161R are connected to each other, it is possible to absorb the heat deformation.

Likewise, since the left and right plates 161L and 161R are bridge-connected to each other via the connection portions 167 and 168, it is possible to reduce an influence of the heat deformation during an operation. Also, since the plates 161 are integrally formed with each other, it is possible to easily carry out the positioning operation of the plate 161 upon manufacturing the reactor 2, and thus to reduce a manufacture cost and a manufacture time.

For example, when the second connection portion 168 having a width of 0.2 mm or less is bridge-connected, elastic deformation easily occurs to thereby absorb the expansion of the plate 161.

Embodiment 3

Next, the engine system according to a third embodiment of the invention will be described. In the engine system according to the present embodiment, the same reference numerals are given to the same components as those of the first embodiment (see FIG. 1 or the like) or the second embodiment (see FIG. 5), and the repetitive description thereof will be omitted. The different parts from the first embodiment and the second embodiment will be mainly described.

Figure 6:
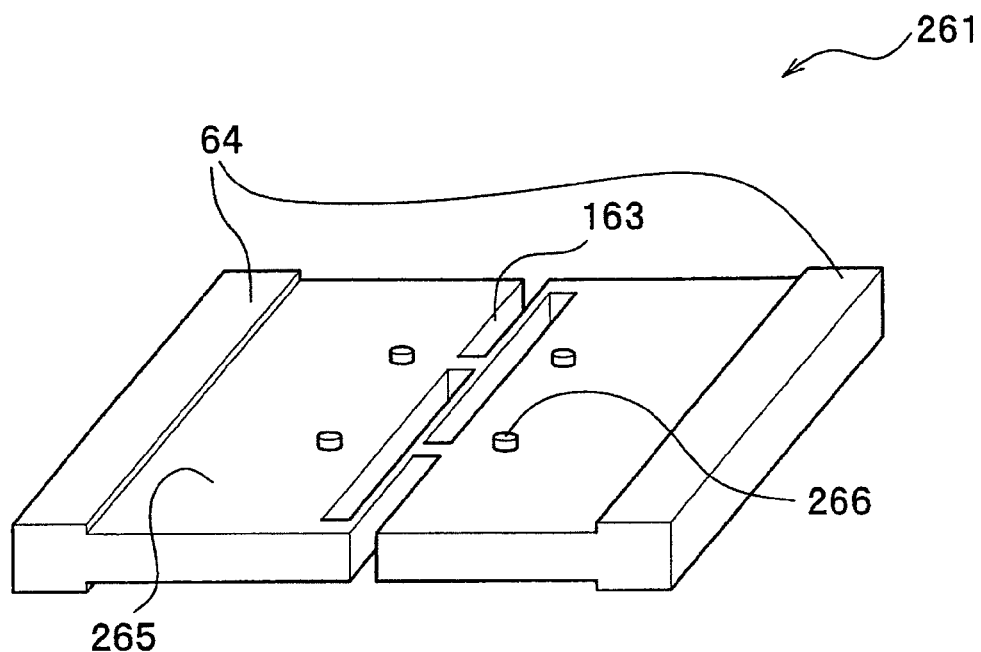
FIG. 6 is a perspective view showing a plate disposed in an inside of a fuel passageway of a reactor according to a third embodiment of the invention.

FIG. 6 is a perspective view showing a plate 261 disposed in the inside of the fuel passageway 51 of the reactor 1 according to the present embodiment.

In the present embodiment, protrusions 266 are formed in a second plate 265, and the other configurations are the same as those of the second embodiment. It is desirable that a height of each protrusion 266 is the same as that of the first plate 64 got higher in a stepped shape from the second plate 265 or twice higher than that of the first plate 64. In case of the same height, it is desirable that the protrusions 266 are formed in both surfaces of the second plate 265. On the other hand, in case of twice height, it is desirable that the protrusion 266 is formed in one surface.

In the adjacent laminated plates 261 and 261, a gap between the second plates 265 and 265 opposed to each other forms a fuel passageway. With such a configuration, since the protrusions 266 and 266 formed in the second plates 265 and 265 opposed to each other are brought into contact with each other or the protrusion 266 is brought into contact with the opposed second plate 265 as well as the first plates 64 combined with each other, it is possible to maintain a gap between the adjacent plates 261 and 261 by using the protrusion 266 as a support, and thus to prevent the non-uniform state of the fuel passageway.

A shape of the protrusion 266 may be a semi-spherical shape, a conical shape, or a pyramid shape, but it is desirable that the protrusion 266 is formed into a surface-contacting shape such as a cylindrical shape or a prism shape because the contact parts are easily deformed when, due to the heat deformation, the protrusion 266 is brought into contact with the adjacent laminated plates 261 or is brought into contact with the housing 53 (see FIG. 3) as an outer wall to be slid thereon. It is also desirable that the representative diameter in the case of, for example, the cylindrical projection 266 is not more than 10 mm which depth does not prevent the hydrogen medium from flowing.

Embodiment 4

Next, the engine system according to a fourth embodiment of the invention will be described. In the engine system according to the present embodiment, the same reference numerals are given to the same components as those of the first embodiment to the third embodiment, and the repetitive description thereof will be omitted. The different parts from the first embodiment to the third embodiment will be mainly described.

Figure 7:
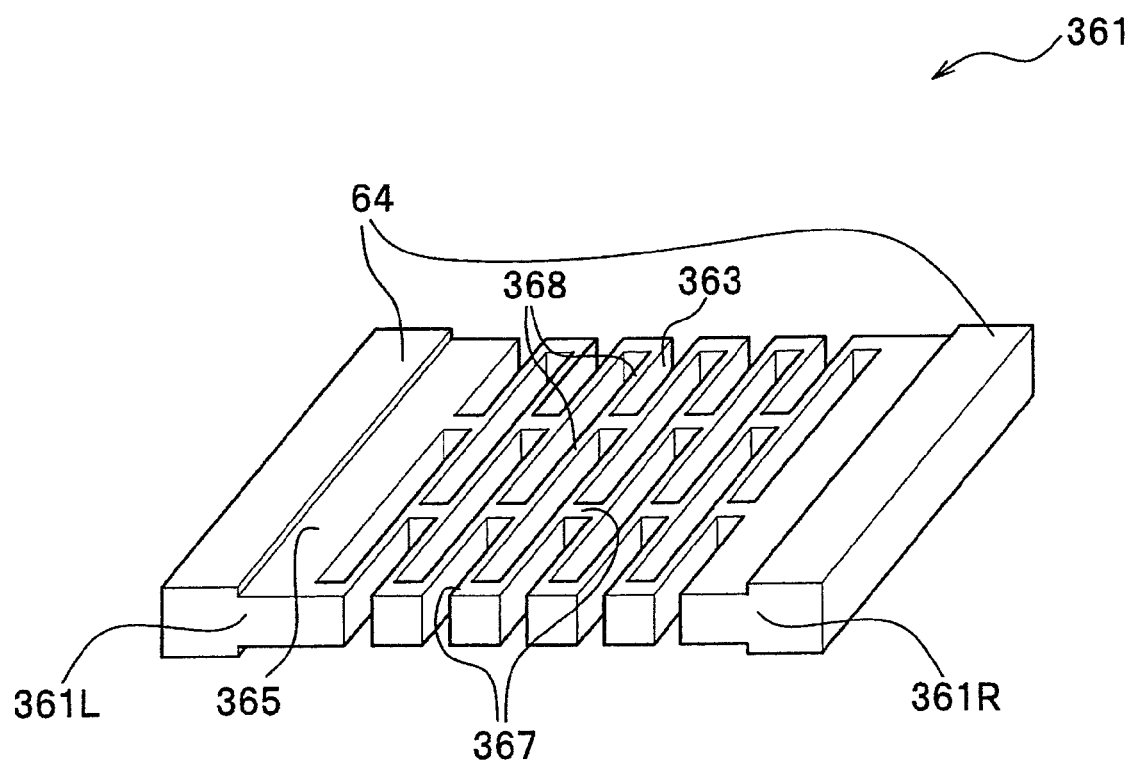
FIG. 7 is a perspective view showing a plate disposed in an inside of a fuel passageway of a reactor according to a fourth embodiment of the invention.

FIG. 7 is a perspective view showing a plate 361 disposed in the inside of the fuel passageway 51 of the reactor 1 according to the present embodiment.

In the present embodiment, a plurality of slits 363 is formed in a second plate 365. Since the plurality of slits 363 is provided, it is possible to increase the surface area of the plate 361. Since the performance of the reactor 1 is improved by increasing the contact area between the hydrogen medium and the plate 361 carrying the catalyst, it is possible to realize a compact in size of the reactor 1. Even in the present embodiment, like the second embodiment shown in FIG. 5, basically, a right plate 361R and a left plate 361L are connected to each other via a first connection portion 367 and a second connection portion 368. In the example shown in FIG. 7, the second connection portion 368 is provided at two positions in a heat transmission direction, but in a case where heat resistance of the second connection portion 368 is relatively high, it is possible to facilitate the heat supply by providing the second connection portion 368, for example, at three positions or more.

Embodiment 5

Next, the engine system according to a fifth embodiment of the invention will be described. In the engine system according to the present embodiment, the same reference numerals are given to the same components as those of the first embodiment to the fourth embodiment, and the repetitive description thereof will be omitted. The different parts from the first embodiment to the fourth embodiment will be mainly described.

Figure 8:
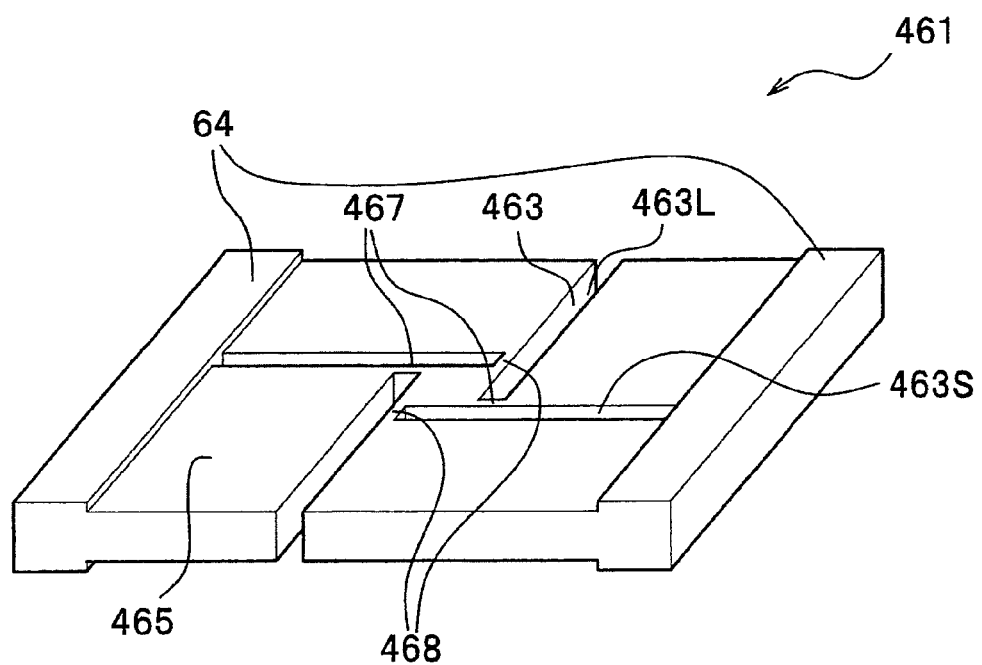
FIG. 8 is a perspective view showing a plate disposed in an inside of a fuel passageway of a reactor according to a fifth embodiment of the invention.

FIG. 8 is a perspective view showing a plate 461 disposed in the inside of the fuel passageway 51 of the reactor 1 according to the present embodiment.

In the present embodiment, a plurality of slits 463 is formed in the plate 461. The slit 463 includes a longitudinal slit 463L extending in a flow passageway direction and a transverse slit 463S extending in a direction perpendicular to the flow passageway, which are formed in two directions meeting at right angles.

Then, in the present embodiment, as shown in FIG. 8, the longitudinal slit 463L is formed in a linear shape in a fuel flowing direction at a position slightly deviated from the center point in a transverse direction of a surface meeting at right angles with a fuel flowing direction of the plate 461. The transverse slit 463S is formed in a linear shape in a direction meeting at right angles with a fuel flowing direction at a position slightly deviated from the center point in a longitudinal direction of a surface in a fuel flowing direction of the plate 461. Here, the slits 463L and the 463S do not communicate with each other, and connection portions 467 and 468 are formed therebetween, respectively.

Likewise, since the longitudinal slit 463L and the transverse slit 463S are provided, it is possible to reduce heat deformation in a flow passageway direction where fuel flows and a direction meeting at right angles with the flow passageway. Additionally, fluid flowing to the fuel passageway 62 (see FIG. 3) formed by laminating the plates 461 by using a stepped portion between the first plate 64 and the second plate 465 passes through a position in the vicinity of any one of the slits 463 (463L and 463S), thereby facilitating the flow of the fluid between the adjacent flow passageways. From this point, since it is possible to make uniform the flow of the fuel between the fuel passageways 62, . . . , 62, it is possible to improve the reaction efficiency of the reactor 1.

Embodiment 6

Next, the engine system according to a sixth embodiment of the invention will be described. In the engine system according to the present embodiment, the same reference numerals are given to the same components as those of the first embodiment to the fifth embodiment, and the repetitive description thereof will be omitted. The different parts from the first embodiment to the fifth embodiment will be mainly described.

Figure 9:
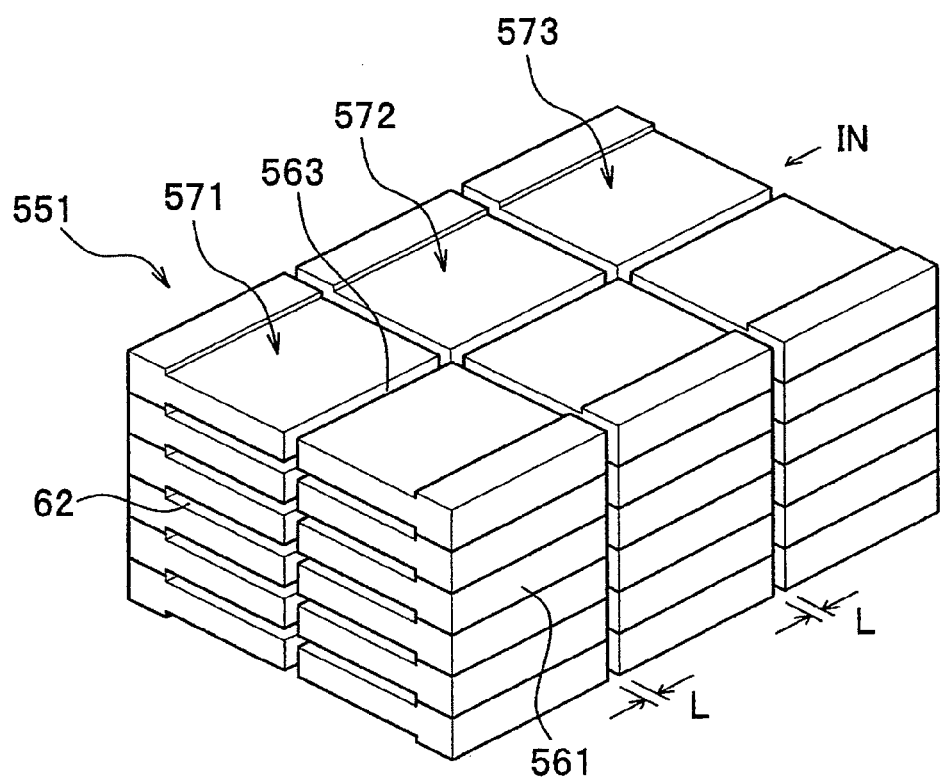
FIG. 9 is an external perspective view schematically showing a plate disposed in an inside of a fuel passageway of a reactor according to a sixth embodiment of the invention.

FIG. 9 is an external perspective view schematically showing only the portion where the plates are laminated as shown in FIG. 3 in a fuel flowing direction, in a plate 561 disposed in the inside of a fuel passageway 551 of the reactor according to the present embodiment.

Three laminated plates 571, 572, and 573 having the plurality of laminated plates 561 are disposed with a predetermined gap L therebetween in a fuel flowing direction. With such a configuration, it is possible to obtain the following advantages. That is, when the laminated plate 573 corresponding to a fuel entrance (see the arrow IN) is largely deformed by heat, the plate fuel passageway 62 of the fuel entrance (see the arrow IN) becomes non-uniform, thereby causing a case in which in some parts, the fuel does not contact with the medium. Even in this case, the uniform plate fuel passageway 62 is ensured in the other laminated plates 571 and 572 less influenced by heat than the laminated plate 573. Accordingly, the fuel passing through a slit 563 of the laminated plate 573 passes through the plate fuel passageway 62 of the laminated plates 571 and 572, thereby preventing deterioration of the reaction efficiency of the reactor 1.

As described above, the preferred embodiments of the invention have been described. The invention is not limited to the description of the drawings, but may be modified within a scope not departing from the spirit of the invention.

For example, the slit is formed in a linear shape, but may be formed in a curve shape or a wave shape. Additionally, the number of connection portions formed as bridge in the slit may increase. Likewise, various modifications may be made within a scope not departing from the spirit of the invention that the influence of the heat deformation reduces.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An engine system in which either hydrogen produced from a hydrogen containing medium in terms of a reaction using a catalyst or a mixture of the hydrogen and the hydrogen containing medium is employed as a fuel, the engine system comprising a reactor configured to cause a reaction using the catalyst, wherein said reactor is configured by alternately disposing a plurality of exhaust passages and a plurality of fuel passageways of said engine system with a wall interposed therebetween, wherein at least one carrier configured to carry said catalyst and to be formed in a substantially rectangular plate shape is interposed in an inside of at least one of said plurality of fuel passageways, and wherein said at least one carrier is provided with a plate portion which has a surface disposed in a fuel flowing direction and is formed in a substantially rectangular plate shape, and at least one slit portion which divides the surface of said plate portion in said fuel flowing direction.

2. The engine system according to claim 1, wherein at least one connection portion is provided to mutually bridge-connect divided plate portions opposed to each other with said at least one slit portion interposed therebetween.

3. The engine system according to claim 1, wherein said at least one carrier is provided between an inlet and an outlet of the reactor with at least one second slit portion which divides the surface of said plate portion in a direction perpendicular to said fuel flowing direction.

4. The engine system according to claim 3, wherein at least one connection portion is provided between said at least one slit portion and said at least one second slit portion to mutually bridge-connect divided plate portions opposed to each other.

5. The engine system according to claim 1, wherein a plurality of said carriers is laminated with a predetermined gap therebetween in a direction perpendicular to said fuel flowing direction, and
   wherein said slit portions and/or second slit portions of at least adjacent ones in said carriers are formed at substantially the same position.

6. The engine system according to claim 5, wherein said plurality of the laminated carriers configured to have a plurality of the carriers disposed to be laminated, is arranged with a predetermined gap therebetween in said fuel flowing direction.

7. An engine system for catalytically producing hydrogen from a hydrogen containing medium or a mixture of the hydrogen and the hydrogen containing medium, the engine system comprising:
   a plurality of exhaust passages and a plurality of fuel passageways passing through a reactor, the plurality of exhaust passages and the plurality of fuel passageways being alternately stacked in the reactor with walls interposed between the plurality of exhaust passages and the plurality of fuel passageways;
   at least one carrier having a rectangular plate shape, the at least one carrier configured to carry a catalyst and fit in at least one of the plurality of fuel passageways to form at least one plate-fuel passageway through the at least one of the plurality of fuel passageways in the reactor; and
   at least one first slit portion dividing a surface of a plate portion of the at least one carrier in a fuel flowing direction.

8. The engine system according to claim 7, wherein at least one connection portion bridge-connects divided plate portions of the at least one carrier across the at least one first slit portion.

9. The engine system according to claim 7, wherein the at least one carrier is provided with at least one second slit portion which divides the plate portion of the at least one carrier in a direction perpendicular to the fuel flowing direction.

10. The engine system according to claim 9, wherein at least one second connection portion is provided between the at least one first slit portion and the at least one second slit portion to bridge-connect divided plate portions opposed to each other.

11. The engine system according to claim 7, wherein a plurality of the carriers is laminated with gaps therebetween forming plate-fuel passageways,
   wherein the first slit portions of adjacent carriers substantially coincide in position.

12. The engine system according to claim 10, wherein a plurality of the carriers is laminated with gaps therebetween forming plate-fuel passageways,
   wherein the first slit portions and/or the second slit portions of adjacent carriers substantially coincide in position.

13. The engine system according to claim 1, wherein said at least one carrier is provided between an inlet and an outlet of the reactor with at least one second slit portion which divides the surface of said plate portion in a direction perpendicular to said fuel flowing direction, and at least one connection portion is provided between said at least one slit portion and said at least one second slit portion to mutually bridge-connect divided plate portions opposed to each other.

14. The engine system according to claim 13, wherein a plurality of said carriers is laminated with a predetermined gap therebetween in a direction perpendicular to said fuel flowing direction, and
   wherein said slit portions and/or second slit portions of at least adjacent ones in said carriers are formed at substantially the same position.

15. The engine system according to claim 7, wherein the at least one carrier is provided with at least one second slit portion which divides the plate portion of the at least one carrier in a direction perpendicular to the fuel flowing direction, at least one second connection portion is provided between the at least one first slit portion and the at least one second slit portion to bridge-connect divided plate portions opposed to each other, a plurality of the carriers is laminated with gaps therebetween forming plate-fuel passageways,
   wherein the first slit portions and/or the second slit portions of adjacent carriers substantially coincide in position.

16. The engine system according to claim 1, wherein said at least one slit portion which divides the surface of said plate portion of said at least one carrier is disposed in at least one of said plurality of fuel passageways.

17. The engine system according to claim 7, wherein the at least one first slit portion dividing the plate portion of the at least one carrier is disposed in the at least one of the plurality of fuel passageways.

* * * * *